March 4, 1930.  F. W. SCHMIDT  1,749,358
DEMOUNTABLE RIM AND ITS COOPERATING FELLY
Filed March 19, 1925
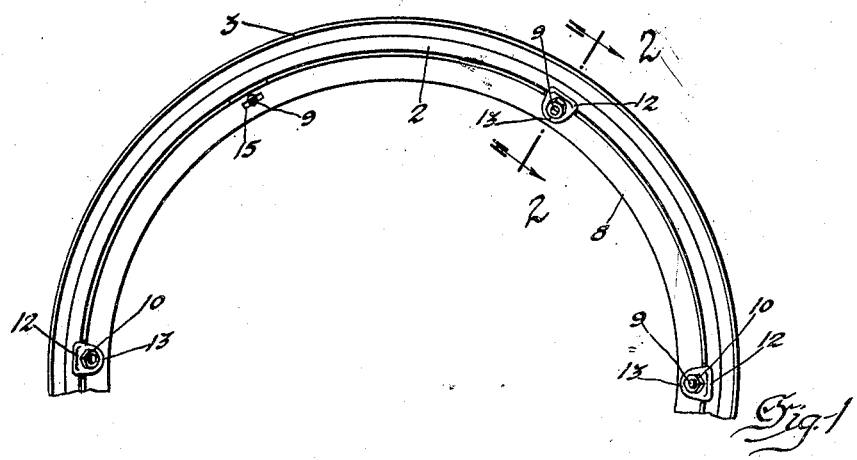
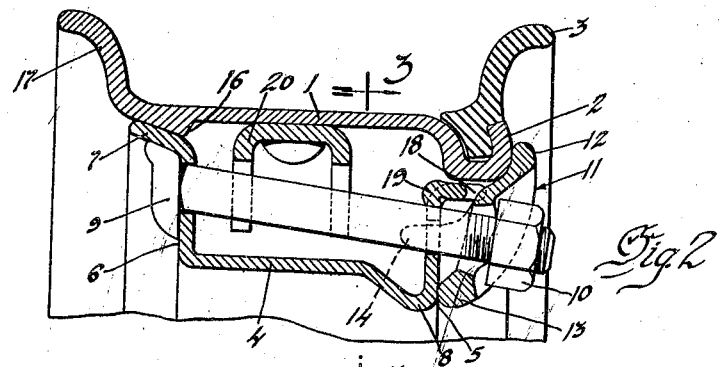
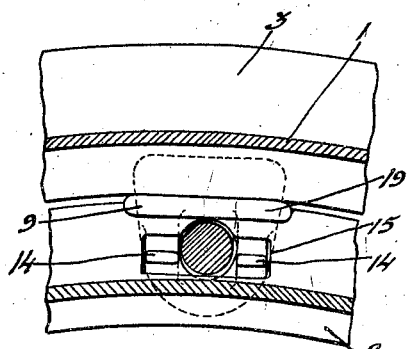
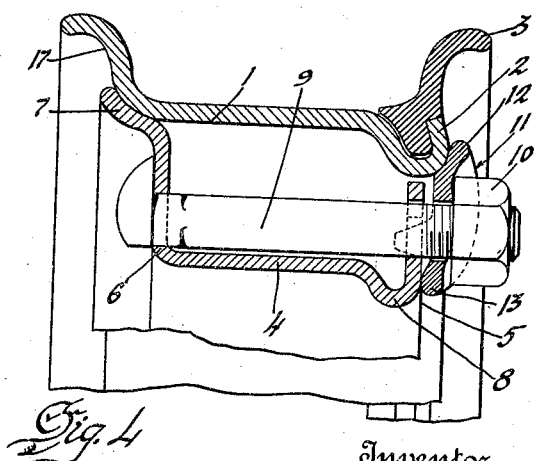
Inventor
Frank W. Schmidt
By Attorneys Patented Mar. 4, 1930

1,749,358

UNITED STATES PATENT OFFICE

FRANK W. SCHMIDT, OF JACKSON, MICHIGAN, ASSIGNOR TO GENERAL MOTORS CORPORATION, OF DETROIT, MICHIGAN, A CORPORATION OF DELAWARE

DEMOUNTABLE RIM AND ITS COOPERATING FELLY

Application filed March 19, 1925. Serial No. 16,689.

This invention relates to improvements in demountable rims and their cooperating fellies.

It is an object of the invention to provide a felly which may be easily formed and is adapted for cooperation with the rim securing means in a very simple manner. In the form of invention disclosed, I have so constructed the felly that the rim securing means has cooperation with only one portion thereof, which portion may be very easily shaped.

It is a further object of my invention to provide a felly which will permit more effective seating and, preferably, centering of the rim upon the felly preparatory to the rim securing operation.

Another object of my invention is to so modify a felly of usual section that it may be adapted for use with the wider rims now in vogue. This adaptation is further facilitated by a modification of the rim to cooperate with the felly in a novel manner.

Referring to the drawings:

Figure 1 is a side elevation of a portion of an assembled rim and felly made in accordance with my invention;

Figure 2 is a section on the line 2—2 of Figure 1;

Figure 3 is a section on line 3—3 of Figure 2; while

Figure 4 is a sectional view of a modified construction.

On the drawing, 1 indicates the rim which, in the form shown, is provided with a flange formed into a gutter 2 for the reception of the usual tire securing means 3. The felly 4 is formed with upstanding portions or legs, 5 indicating the front leg and 6 the rear leg. The back leg is flanged over as at 7 to provide a seating and centering means for the rim. The base of the felly is preferably dropped as at 8 adjacent the front leg 5 in order to provide said front leg with sufficient width so that it may effectively serve as a seat in connection with the rim clamping means. In the embodiment shown, this rim clamping means comprises a bolt 9 passing through apertures in the front and back legs of the felly and serving, when its nut 10 is drawn up, to hold the rim securing means or member 11 in operative position. This member 11 is provided with a rim engaging portion 12, a portion constituted by a lug 13 which has rocking engagement with the front leg of the felly, thus serving as a fulcrum, and with spaced guide portions consisting of lugs 14 which engage in sockets or apertures 15 constituting continuations of the bolt receiving opening.

It will thus be seen that as the nut 10 is tightened the rim securing member 11 will be rocked on its fulcrum 13, the guide portions 14 will be forced into the sockets 15 and the rim-engaging portion 12 will engage the rim and force it into engagement with the felly. It will thus be seen that the member 11 has cooperation solely with the front leg of the felly and that this portion of the felly is most easily formed into desired shape. It will now be seen that the provision of the drop base portion 8 enables an increase in width of the front leg 5 of the felly of such extent as to enable the use of a rocking rim securing member of such dimensions as to afford a proper amount of leverage.

In order to adapt the felly for cooperation with the wider rims such as are now coming into use I resort to the following devices. It will be observed that the rim 1 is provided with a bead 16 and, as shown in Figure 2, the flange 7 of the felly has engagement with this bead instead of with the customary rim flange shown at 17. This permits the rim to extend slightly beyond the back side of the felly. As the rim is, as above stated, provided with the usual flange 17 which customarily serves as a centering surface, it will be noted that the rim has two centering means spaced transversely and radially, and thus the rim is adapted for cooperation with fellies of slightly differing diameters.

To permit a similar extension of the rim beyond the front leg of the felly this leg is provided with a turned-down portion 18. The rim, or, more specifically, the rim gutter as here shown, is adapted to seat upon this turned-down portion when the rim is being placed upon the felly preparatory to the tightening of the rim clamping means. It will be noted that the turned-down portion of the front leg of the felly is formed back as at 19 in order to clear the rim securing member 11 and give it sufficient play for its clamping action.

Referring again to Figure 2, it will be noted that the bolt 9 is inclined with respect to the wheel axis. This permits a compact and effective assembly and brings the head of the bolt in contact with the flange 7 of the felly, and, since the head of the bolt is shaped to conform to the flange, the bolt is locked against rotation.

I have also provided a very simple and cheap means for driving the wheel rim. This means comprises a U-shaped member 20 secured to the under side of the rim and straddling the bolt 9 which constitutes the driving member.

In the modification shown in Figure 4, the same reference characters refer to the same parts as in the preferred form.

This modification is distinguished from that form in that the turned-down portion 18 of the front leg of the felly is omitted and the rim is not provided with the bead 16. It will also be observed that the bolt 9 of the modification is not inclined as in the form shown in Figure 2.

While several illustrative embodiments of my invention have been shown and described, it is not my intention to limit the scope of the invention to those embodiments, or otherwise than by the terms of the appended claim.

What I claim is:

A wheel felly comprising a base portion, and radial side flanges spaced apart from one another and extending outwardly from said base; the periphery of the inner one of said flanges being shaped to receive and support the inner side of a rim, and the inner part of the outer of said flanges serving as a fulcrum for clamps for securing a rim in place upon the felly; the base of the felly where it merges with the outer of said side flanges being depressed inwardly and toward the axis of the wheel to thereby provide a continuous circumferentially extending ridge depending from the base whereby fulcrums for the clamps aforesaid are provided which lie inside the base and nearer the axis of the wheel than the base.

In testimony whereof I affix my signature.

FRANK W. SCHMIDT.